(12) United States Patent
De Baere et al.

(10) Patent No.: US 11,917,949 B2
(45) Date of Patent: Mar. 5, 2024

(54) ROTOR KNIFE INSERT ASSISTANT

(71) Applicant: CNH Industrial America LLC, New Holland, PA (US)

(72) Inventors: Freek De Baere, Zedelgem (BE); Daan Brouckaert, Veldegem (BE); Nicolas Zwaenepoel, Klemskerke (BE)

(73) Assignee: CNH Industrial America LLC, New Holland, PA (US)

( * ) Notice: Subject to any disclaimer, the term of this patent is extended or adjusted under 35 U.S.C. 154(b) by 429 days.

(21) Appl. No.: 17/146,414

(22) Filed: Jan. 11, 2021

(65) Prior Publication Data
US 2021/0212264 A1 Jul. 15, 2021

(30) Foreign Application Priority Data
Jan. 10, 2020 (EP) .................................... 20151182

(51) Int. Cl.
*A01F 15/10* (2006.01)
*A01D 90/04* (2006.01)

(52) U.S. Cl.
CPC .............. *A01F 15/10* (2013.01); *A01D 90/04* (2013.01); *A01F 2015/107* (2013.01)

(58) Field of Classification Search
CPC ................ A01F 15/10; A01F 2015/107; A01F 2015/108; A01F 29/095; A01D 90/04
See application file for complete search history.

(56) References Cited

U.S. PATENT DOCUMENTS

5,974,776 A * 11/1999 Prellwitz ................ A01D 90/04
56/504
6,370,851 B1 * 4/2002 Uros ..................... A01F 15/106
100/88
(Continued)

FOREIGN PATENT DOCUMENTS

CA 3140986 A1 * 12/2020 ............. A01F 25/20
CH 675342 A5 * 9/1990 ............. A01D 90/04
(Continued)

OTHER PUBLICATIONS

Extended European Search Report for application EP20151182.1, dated Jul. 6, 2020 (7 pages).

*Primary Examiner* — Arpad F Kovacs
(74) *Attorney, Agent, or Firm* — Peter K. Zacharias

(57) ABSTRACT

A crop cutting device including a crop guiding surface, a plurality of parallel knives, and an actuating mechanism for moving the knives between a retracted inoperative position below the crop guiding surface and an extended operative position. A portion of the knives projects above the crop guiding surface. A plurality of movable operating members is associated with respective ones of the plurality of knives and movable from a first position in which the knives are in the retracted inoperative position, to a second position in which the knives are in the extended operative position. A support frame holds the operating members in a sliding relation to the support frame. The knife insert assistant is coupled to the support frame and configured for blocking a sliding movement of the operating members relative to the support frame during a movement of the support frame from the retracted position to the employed position.

10 Claims, 6 Drawing Sheets

(56) References Cited

U.S. PATENT DOCUMENTS

| | | | | |
|---|---|---|---|---|
| 6,912,835 | B1 * | 7/2005 | Chabassier | A01F 15/10 241/243 |
| 2009/0272089 | A1 * | 11/2009 | Lucot | A01D 90/04 56/131 |
| 2016/0057937 | A1 * | 3/2016 | McClure | A01F 15/08 56/341 |
| 2016/0219789 | A1 * | 8/2016 | Derscheid | A01F 15/10 |
| 2016/0219790 | A1 * | 8/2016 | McClure | A01F 15/106 |
| 2020/0093068 | A1 * | 3/2020 | Claeys | A01F 15/10 |

FOREIGN PATENT DOCUMENTS

| | | | | | |
|---|---|---|---|---|---|
| DE | 3625512 | A | * | 2/1988 | A01D 90/04 |
| DE | 4012533 | A1 | * | 10/1991 | A01D 90/04 |
| DE | 4302199 | A1 | * | 7/1994 | A01D 90/04 |
| DE | 19707662 | A1 | * | 8/1998 | A01D 90/04 |
| DE | 19805854 | C1 | * | 5/1999 | A01D 90/04 |
| DE | 102012007634 | A1 | * | 10/2013 | A01F 15/10 |
| DE | 102013007304 | A1 | * | 10/2014 | A01D 90/04 |
| DE | 202017100339 | U1 | * | 3/2017 | A01D 90/04 |
| EP | 0341508 | A1 | * | 11/1989 | A01D 90/04 |
| EP | 0689760 | A1 | * | 1/1996 | A01D 90/04 |
| EP | 1584226 | A2 | * | 10/2005 | A01D 90/04 |
| EP | 1609354 | A2 | | 12/2005 | |
| EP | 2653025 | A1 | | 10/2013 | |
| EP | 2910105 | A1 | * | 8/2015 | A01D 90/04 |
| EP | 3050426 | A1 | * | 8/2016 | A01D 90/04 |
| EP | 3275303 | A1 | | 1/2018 | |
| EP | 3864952 | A1 | * | 8/2021 | A01D 75/182 |
| WO | WO-2020240428 | A1 | * | 12/2020 | A01F 25/20 |

* cited by examiner

ROTOR KNIFE INSERT ASSISTANT

TECHNICAL FIELD

The present invention relates to a crop cutting device for an agricultural harvester, a knife insert assistant for use in such a crop cutting device and an agricultural harvester comprising such a crop cutting device.

BACKGROUND

Agricultural balers are used to consolidate and package crop material so as to facilitate the storage and handling of the crop material for later use. For example, when the crop is hay, a mower-conditioner is typically used to cut and condition the crop material for windrow drying in the sun. As another example, when the crop is straw, an agricultural combine discharges non-grain crop material from the rear of the combine defining the straw which is to be picked up by the baler. The cut crop material is usually dried, and a baler, such as a large square baler or round baler, straddles the windrows and travels along the windrows to pick up the crop material and form it into bales.

On a large square baler, pickup apparatus at the front of the baler gathers the cut and windrowed crop material from the ground. The pickup apparatus includes a pickup roll, and may include other components such as side shields, stub augers, a wind guard, etc. A rotor cutter apparatus is then used to move the crop material from the pickup apparatus to a pre-compression chamber or duct. The rotor cutter apparatus forms a so-called 'wad' of crop within the pre-compression chamber which is then transferred to a main bale chamber where the bales are formed.

Conventional rotor cutter apparatuses include a series of parallel knives which may be extended into the path that is followed by the crop between pickup and further processing when it is desired to cut the crop, and which may be retracted when the crop is to be processed without prior cutting. Many conventional cutting devices are arranged for selectively disabling some of the knives in order to allow the distance between adjacent knives and the cutting length to be increased.

Typically, the knives are individually supported by spring-loaded arms to allow them to be moved out of the way when they encounter hard or heavy obstacles. In this way damage to the knives is prevented. The spring-loaded arms of all the knives may together be supported by a support frame. An actuator, coupled to the support frame can then retract the knives by moving the support frame away from the knives. Moving the support frame in the opposite directions pushes the knives back into the crop path.

When positioned in the crop path, the knives extend through appropriately dimensioned slots in a crop guiding surface. In their retracted configurations, the knives are situated under the crop guiding surface. Intermediate configurations may be available in which only a portion of the knives' cutting edges extend through the crop guiding surface. When the knives are retracted, crop and dirt may fill the slots of the crop guiding surface and hinder the extension of the knives into the crop path. When one or more of the slots of the crop guiding surface are blocked, moving the support frame forward may just result in compressing the springs of the respective spring-loaded knives and the spring force may be insufficient to open up the slot and push the knives back into the crop path. Consequently, some of the knives may not be employed and the cutting quality may be diminished.

It is an aim of the present invention to address one or more disadvantages associated with the prior art.

SUMMARY OF THE INVENTION

According to an aspect of the invention there is provided a crop cutting device for an agricultural harvester comprising a crop guiding surface, a plurality of substantially parallel knives and an actuating mechanism. The knives are mounted below the crop guiding surface and aligned with respective slots in the crop guiding surface. The knives are movable between a retracted inoperative position below the crop guiding surface and an extended operative position wherein at least a portion of a cutting edge of the knives projects above the crop guiding surface. The actuating mechanism is operative to move the knives between the retracted inoperative position and the extended operative position.

The actuating mechanism comprises a plurality of movable operating members, a support frame and an actuator. The operating members are associated with respective ones of the plurality of knives and movable from a first position in which the knives are in the retracted inoperative position, to a second position in which the knives are in the extended operative position. The support frame is configured to hold the operating members in a sliding relation to the support frame. The actuator is coupled to the support frame for moving the support frame between an employed position and a retracted position, the employed position being closer to the knives than the retracted position. The crop cutting device further comprises a knife insert assistant that is coupled to the support frame and configured for blocking a sliding movement of the operating members relative to the support frame during a movement of the support frame from the retracted position to the employed position.

When not allowing the operating members to slide backwards relative to the support frame, the operating members are pushed forward together with the support frame. By blocking the sliding movement of the operating members in this way, the knife insert assistant ensures that the actuating force applied to the support frame is fully transferred to the knives. As a result, the knives are easily pushed through any crop and dirt that may block the slots in the crop guiding surface. This in contrast with the prior art actuating mechanisms wherein the springs of the spring-loaded operating members typically need to overcome the blocking force of the material closing off the slots.

Preferably, the knife insert assistant is configured for allowing the sliding movement of the operating members relative to the support frame when the support frame is in the employed position. While moving from the retracted position to the employed position, the knife insert assistant ensures that the sliding movement is blocked and all knives are brought into the extended operative position. When in that extended operative position, sliding of the operating members can protect the knives against damage from sudden impacts, e.g. caused by incoming stones or other hard objects.

In an embodiment of the invention, the operating members have an elongated shape, a first end of the elongated operating members is coupled to the respective knives for bringing the knives into the extended operative position, the knife insert assistant comprising a transverse beam for, during the movement of the support frame from the retracted position to the employed position, contacting a second end of the elongated operating members, and thereby blocking the sliding movement of the operating members relative to the support frame. This transverse beam may, e.g., be installed when working in crops, fields and weather conditions wherein slot blockage is more prevalent and/or when knife damage by incoming hard objects is less likely. When knife damage is a bigger concern than slot blockage, the operator may decide to remove the transverse beam and operate the cutting device without it.

Preferably, the transverse beam is configured to stay out of contact with the second end of the operating members when the support frame is in the employed position. For example, the transverse beam may be movable between a blocking and a non-blocking position by an actuator. Such an actuator may be user-operated, or the actuator may be operated automatically when switching between the employed position and the retracted position.

The knife insert assistant may further comprise two side plates provided at both ends of the transverse beam and connected to the support frame for movement therewith during movement of the support frame between the employed position and the retracted position. By moving together with the support frame, the transverse beam continues to block the sliding movement of the operating members. Optionally, the side plates are pivotally connected to the support frame, to allow the transverse beam to be pivoted into and out of its blocking position. During the transition into the employed position, the transverse beam continues to block the sliding movement of the operating members. After reaching the employed position, the transverse beam may be pivoted away to allow sliding movement of the operating members and to therewith protect the extended knives from damage due to impacting hard objects. Alternatively, a top, bottom, front or rear surface of transverse beam is connected to the support fame. Also such connections may either be pivotal or non-pivotal.

The side plates may further comprise a cam track configured for cooperating with a cam follower that is fixedly attached to a chassis of the agricultural harvester. Such cam tracks can provide for additional support and guidance of the transverse beam while moving the support frame. The combination of a pivotal connection to the support frame and the cam track/cam follower connection to the harvester chassis makes it possible to control the movement of the transverse beam relative to the support frame during movement of the support frame. For example, the cam track may comprise a first track section configured to, in cooperation with the cam follower, move the transverse beam in substantially the same direction as the support frame, and a second track section configured to, in cooperation with the cam follower, cause a rotational movement of the transverse beam relative to the support frame. This configuration allows the transverse beam to keep blocking the operating members while the support frame moves forward and the knives are pushed through the slots in the crop guiding surface and to pivot away from the operating members when arriving at, or nearby, the employed position. When moving the support frame back into the retracted position, the cam track will ensure that the transverse beam is brought back into its blocking position such that it can be used again the next time the knives are employed.

In many embodiments, the operating members will be coupled to the support frame via a spring. The springs may, e.g., be metal springs or gas springs.

According to a further aspect of the invention, a knife insert assistant is provided for use in a crop cutting device as described above. The knife insert assistant comprises a transverse beam and two side plates, the two side plates being provided at both ends of the transverse beam and being configured for a pivotal connection to the support frame, the side plates further comprising a cam track configured for cooperating with a cam follower that is fixedly attached to a chassis of the agricultural harvester. Such a knife insert assistant can be retrofitted to existing crop cutting devices in order to obtain all the advantages of the current invention in an already existing agricultural harvester.

Preferably, the cam track comprises a first track section configured to, in cooperation with the cam follower, move the transverse beam in substantially the same direction as the support frame, and a second track section configured to, in cooperation with the cam follower, cause a rotational movement of the transverse beam relative to the support frame.

According to another aspect of the invention, an agricultural harvester is provided comprising a crop cutting device as described above. The agricultural harvester may be a baler.

BRIEF DESCRIPTION OF THE DRAWINGS

Embodiments of the invention will now be described by way of example with reference to the accompanying drawings, in which.

DETAILED DESCRIPTION

Figure 1:
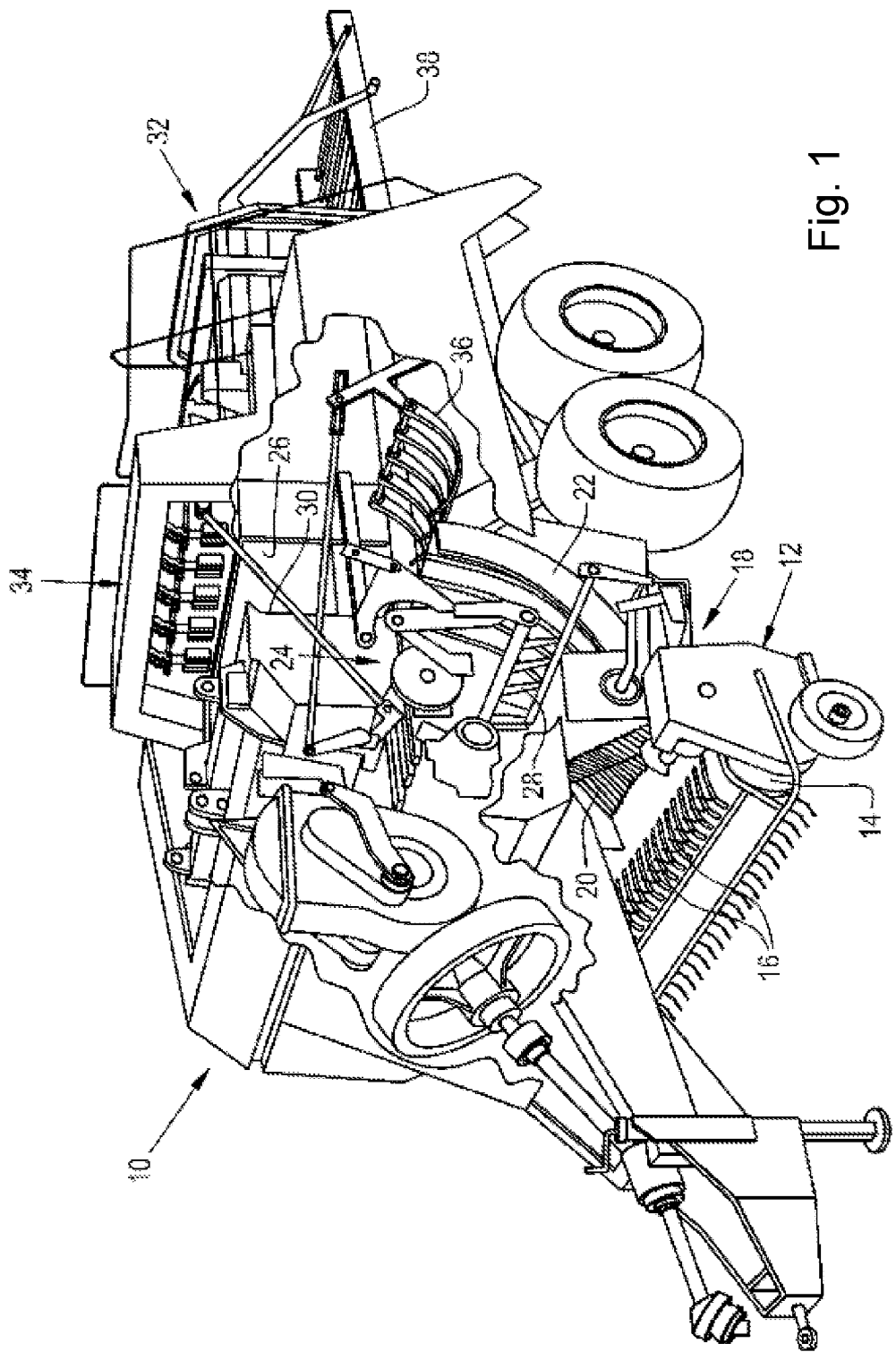
FIG. 1 shows an agricultural baler in which the invention can be advantageously used.

FIG. 1 shows an agricultural baler 10 in the form of a large square baler. In particular, FIG. 1 is a perspective cutaway view illustrating the inner workings of the large square baler 10. The baler 10 has a pickup unit or apparatus 12 for lifting crop material from windrows. The pickup apparatus 12 has a rotatable pickup roll (or rotor or cylinder) 14 with a number of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a wad of crop material. The tines 20 intertwine the crop together and pack the crop within the pre-compression chamber 22. The pre-compression chamber 22 and the rotor assembly with the tines 20 function as a first stage for crop compression.

Once the pressure in the pre-compression chamber 22 reaches a predetermined sensed value, a stuffer unit or apparatus 24 moves the wad of crop from the pre-compression chamber 22 to a bale chamber 26. The stuffer apparatus 24 includes stuffer forks 28 which thrust the wad of crop directly in front of a plunger 30, which reciprocates within the bale chamber 26 and compresses the wad of crop into a flake. The stuffer forks 28 return to their original state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber. Needles 36 bring the lower twine up to the knotters 34 and the tying process then takes place. The twine is cut and the formed bale is ejected from a discharge chute 38 as a new bale is formed.

In FIGS. 2, 3, 5 and 6, the crop cutting device 18 of the agricultural baler 10 of FIG. 1 is shown in more detail. FIG. 4 shows an example of a knife insert assistant 70 according to the invention.

The crop cutting device 18 is fixedly arranged in the chassis of the agricultural baler 10 and may include a frame having a front part in which the knives 42 are mounted and a rear part housing an actuating mechanism 50 for the knives 42. In the front part of the crop cutting device 18 a curved plate is provided which constitutes a guide surface 40 for the crop when the cutting device 18 is arranged in the pickup assembly 12. A plurality of parallel and equidistant slots 41 is formed in the guide surface 40 to allow the knives 42 to move between the extended, operative position (FIGS. 2 and 5) and a retracted, inoperative position (FIGS. 3 and 6) wherein the knives 42 are fully, or at least largely, retracted below the guide surface 40. This movement is a pivoting movement about a pivot shaft 44 which is arranged in the front part of the frame and runs perpendicular to the slots 41.

Each knife 42 has a cutting edge 43, which in this embodiment has a concave curved shape, a rear edge having a convex curved shape and a lower edge. A circular opening is formed near the front of the knife 42 and is accessible through a narrowed channel. The pivot shaft 44 has a flattened segment at the location of each knife 42, which allows the knife 42 to be removed from the shaft 44 by being pivoted to its substantially vertical position, in which the flattened segment fits through the channel.

Figure 2:
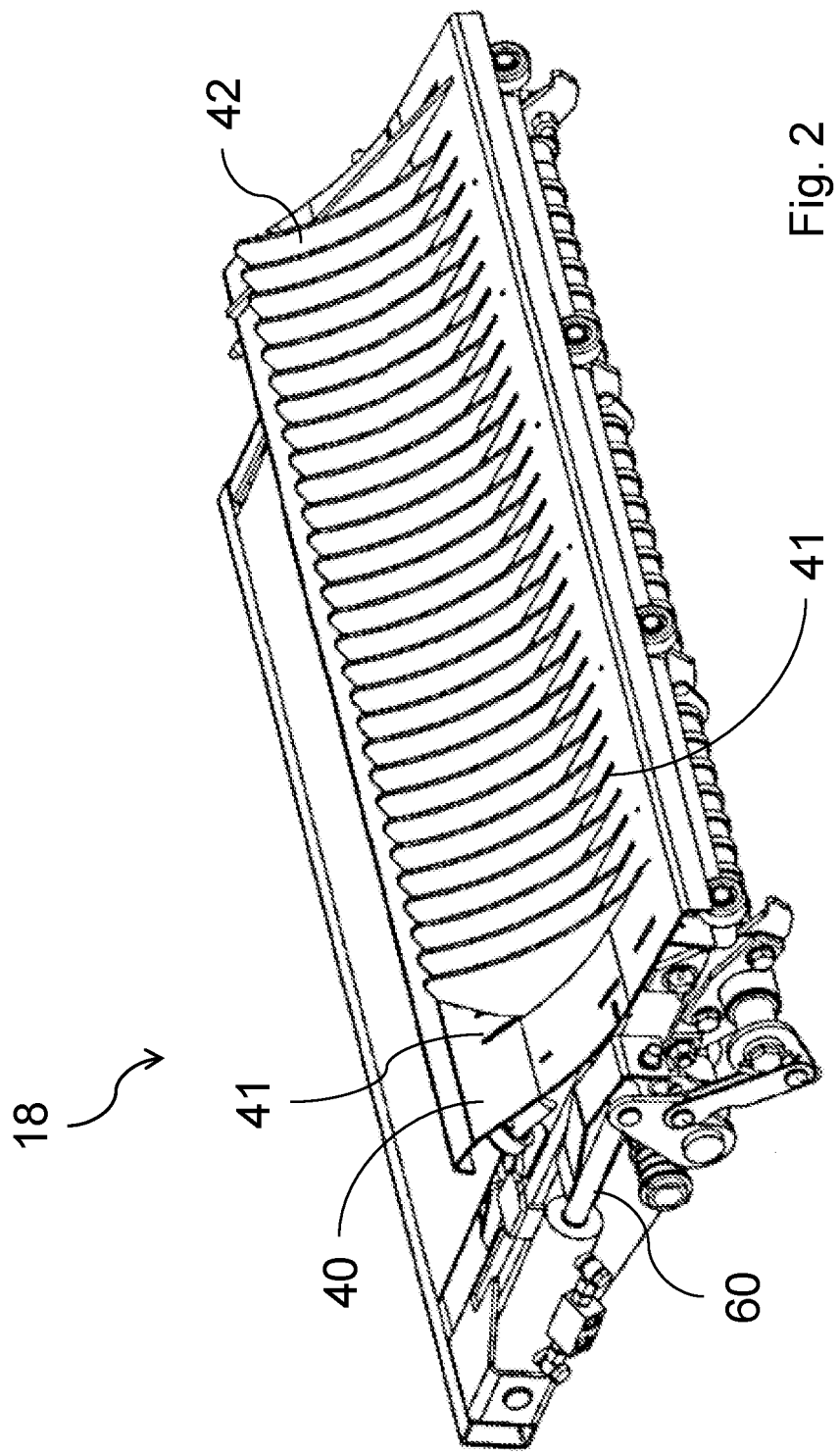
FIG. 2 shows the crop cutting device of the agricultural baler of FIG. 1.
Figure 3:
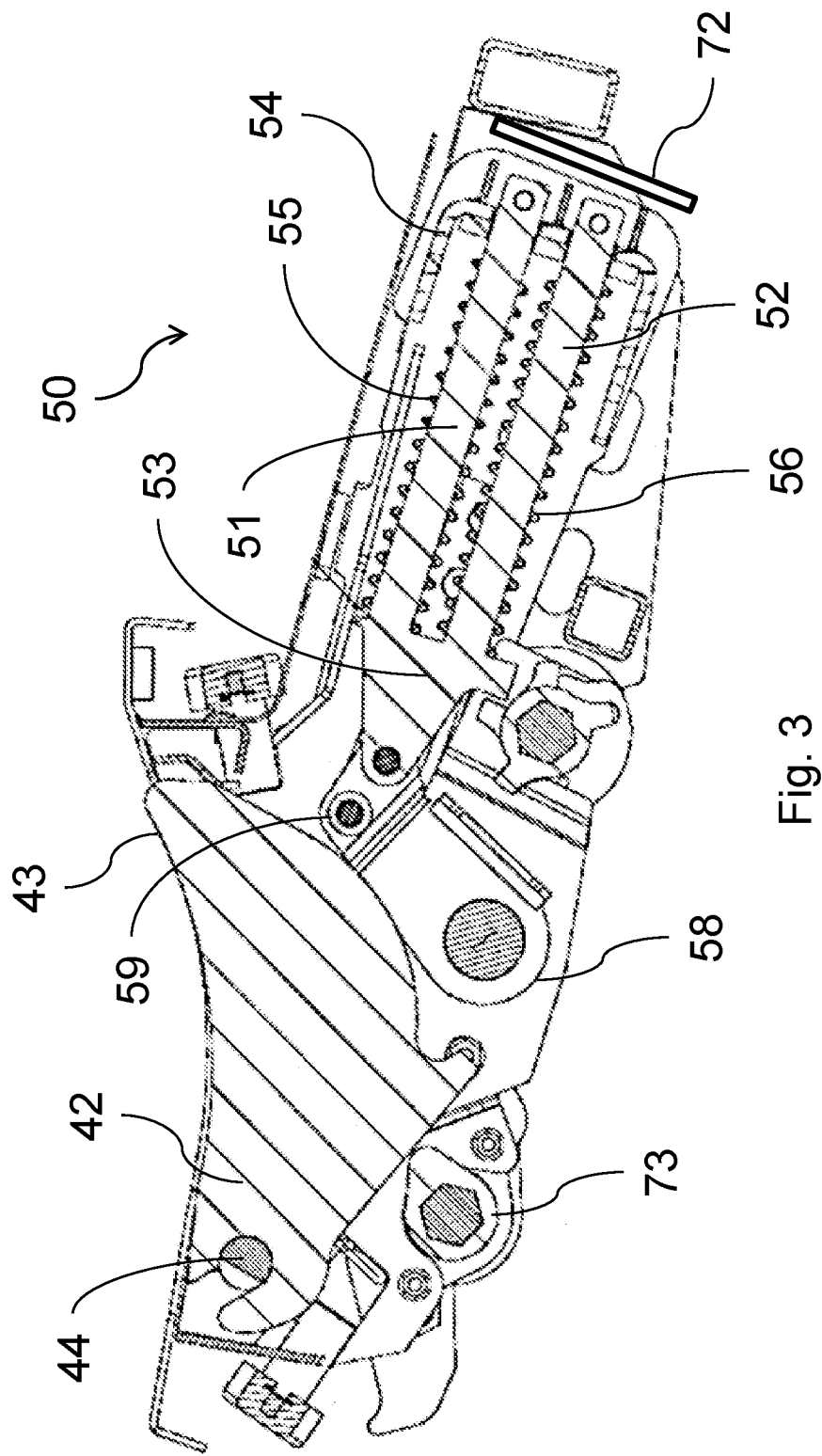
FIG. 3 shows a cross section of the crop cutting device of FIG. 2, with the knives in a retracted position.
Figure 4:
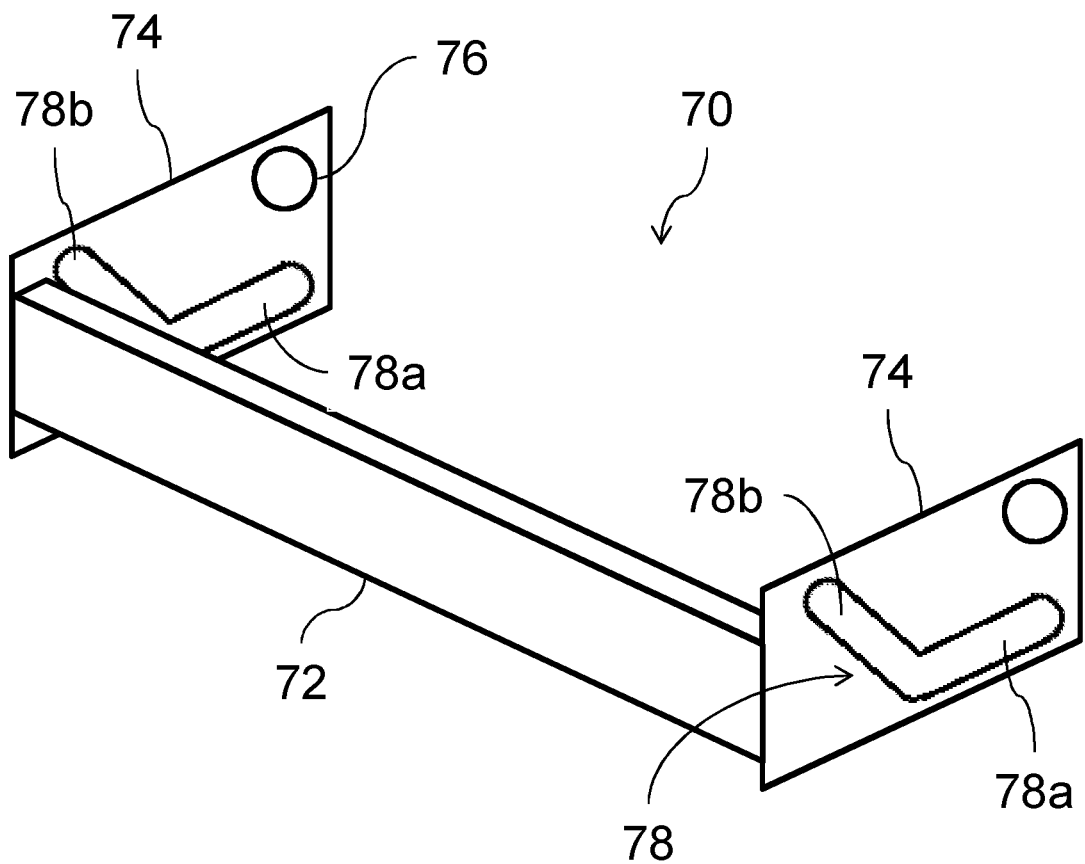
FIG. 4 shows an example of a knife insert assistant according to the invention.
Figure 5:
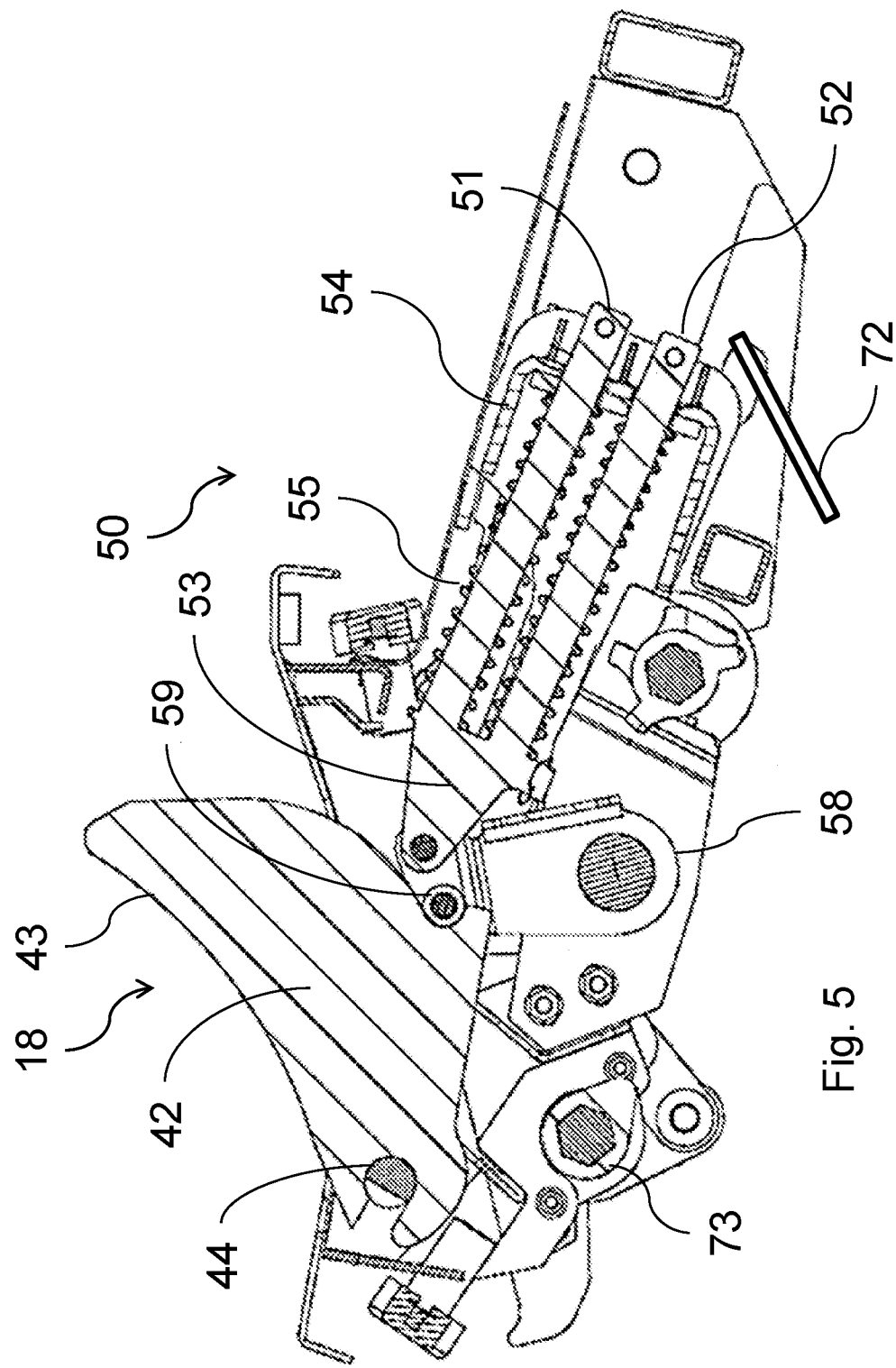
FIG. 5 shows a cross sections of the crop cutting device of FIG. 2, with the knives in an extended position.
Figure 6:
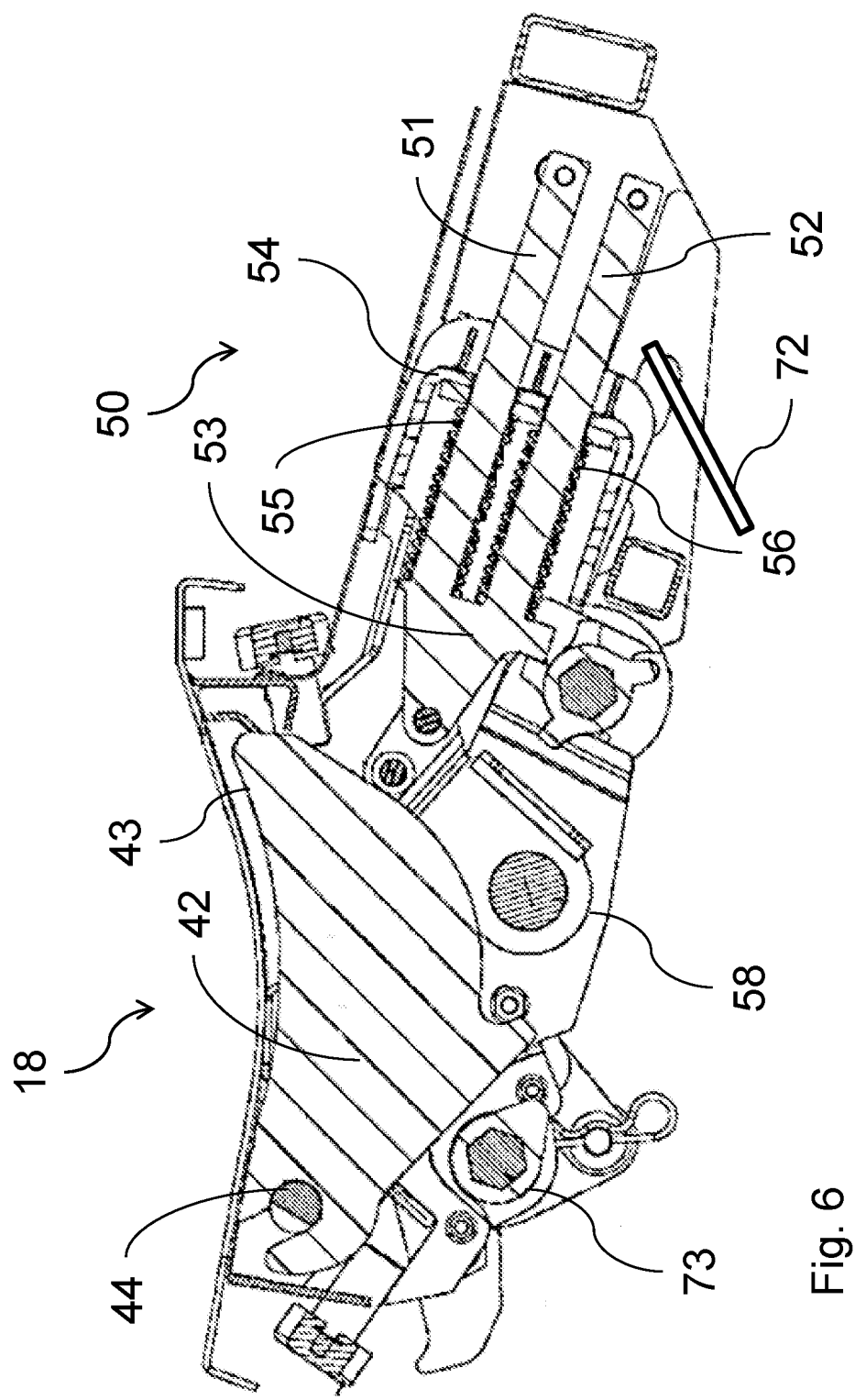
FIG. 6 shows a cross sections of the crop cutting device of FIG. 2, with the knives temporarily retracted to avoid damage.

The actuating mechanism 50, as shown in FIGS. 3, 5 and 6, comprises a plurality of operating members 53 associated with the knives 42. Each operating member 53 includes a body and two legs 51, 52. The legs 51, 52 have free ends which extend through openings in a rear wall of a support frame 54. This support frame 54, which also forms part of the actuating mechanism 50, is slidably arranged in the crop cutting device 18. The rear wall is provided between two side plates of the support frame 54. At least one of the side plates is connected to an end of a piston rod of a hydraulic actuator 60 (FIG. 2). Other types of actuators may be used instead of a hydraulic actuator 60. Compression springs 55, 56 are arranged around each leg 51, 52 and are held between a protrusion of the body of the operating member 53 and a plate arranged at the rear wall of the support frame 54. Although in this embodiment each operating member 53 includes two legs 51, 52 and two compression springs 55, 56 the number of legs 51, 52 and springs 55, 56 could be higher or lower, depending on the spring force that is required and the space that is available. The body of the operating member 53 is connected by means of a pin to a crank 58 that is freely pivotable about a shaft. The crank 58 further carries a roller 59 which is rotatable around a shaft and which rolls along the curved rear edge of the knife 42.

The actuating mechanism 50 can be provided with a single hydraulic actuator 60, which may be arranged either at the right-hand side or on the left-hand side of the cutting device 18. In order to avoid excessive torsion in the actuating mechanism 50, this mechanism can also include hydraulic actuators 60 at both sides. The actuator 60 or actuators 60 are connected at one end to the side plates of the support frame 54, and at another end to the chassis of the agricultural baler 10 or a frame of the crop cutting device 18. The actuator 60 is thus configured to move the support frame 54 between an employed position (FIGS. 5 and 6) and a retracted position (FIG. 3). In the employed position, the support frame 54 is closer to the knives 42 and the front of the cutting device 18 than in the retracted position.

Most of the time, the retracted position of the support frame 54 correspond to a fully inoperative position of the knives 42. However, as shown in FIG. 3, when the support frame 54 is in the retracted position, a cam 73 may be rotated in such a way as to tilt the knife into a slightly operative position wherein only a tip of the cutting edge 43 of the knife extends into the crop path. For the purpose of explaining the current invention, knives 42 in the configuration shown in FIG. 3 will be considered to be in a retracted position. Most of the cutting edge 43 of the knife 42 is situated below the crop guiding surface 40 and the knives 42 can only be really brought back into the crop path by moving the support frame 54 into its employed position (FIG. 5).

The knives 42 are moved from their retracted inoperative position (FIG. 3) to their extended operative position (FIG. 5) by extending the hydraulic actuator 60, thus moving forward the piston rod and the support frame 54. This forward movement is usually transmitted to the body of each operating member 53 by means of the compression springs 55, 56, and results in a forward pivoting movement of the cranks 58. Thus the rollers 59 roll along the rear edge of the knives 42, raising the knives 42 through the slots 41 until each of the rollers 59 reaches a recess in the knife 42 which forms a stop. In an alternative embodiment, each operating member 53 may be coupled to two or more knives 42 that will then be extended and retracted together.

Because the body of each operating member 53 is spring loaded, it may yield whenever the knife 42 encounters a load that is greater than the spring force of the corresponding pair of compression springs 55, 56. This may occur e.g. if a stone or other obstacle is present in the crop that is being guided through the cutting device 18. In that case, as shown in FIG. 6, the knife 42 pivots rearwardly about the shaft 44, and forces the crank 58 to pivot rearwardly as well while the roller 59 moves to the rear along the rear edge of the knife 42. This rearward motion of the crank forces 58 the operating member to move to the rear as well, thus compressing the springs 55, 56 between the operating member 53 and the rear wall of the support frame 54. During this movement the ends of the legs 51, 52 of the operating member are free to extend through the openings of the rear wall. So, while the support frame 54 is still in its employed position, the knife 42 is temporarily retracted.

When the support frame 54 is in its retracted position (FIG. 3) and the knives 42 are mostly or completely situated under the crop guiding surface 40, crop and dirt may fill the slots 41 of the crop guiding surface 40. When one or more of the slots 41 of the crop guiding surface 40 are blocked, moving the support frame 54 forward may just result in the legs 51, 52 of the operating member 53 being pushed through their respective openings in the rear wall of the support frame 54 and compression of the springs 55, 56, while the respective knives 42 remain in their retracted position under the crop guidance surface 40. Consequently, some of the knives 42 may not be employed and the cutting quality may be diminished.

To ensure that all knives 42 are pushed through their respective slots 41 when the support frame 54 is moved forward, the crop cutting device 18 according to the invention further comprises a knife insert assistant 70 with a transverse beam 72 that is coupled to the support frame 54 and configured for blocking a sliding movement of the operating members 53 relative to the support frame 54 during a movement of the support frame 54 from the retracted position to the employed position. As can be seen in FIG. 3, the transverse beam 72 is located directly behind the free ends of the legs 51, 52 of the operating member 53. If a slot 41 is blocked by crop and dirt and the spring force of springs 55, 56 on the legs 51, 52 of the operating member 53 is insufficient to open up the slot 41, movement of the legs 51, 52 relative to the support frame 54 is made impossible by the transverse beam 72 that is situated directly behind the openings in the rear wall of the support frame 54. As a result the transverse beam 72 pushes the operating member 53 forward together with the support frame 54 and the knife 42 is pushed through the blocked slot 42 without needing the spring force of the springs 55, 56.

The transverse beam 72 may, e.g., be installed when working in crops, fields and weather conditions wherein slot blockage is more prevalent and/or when knife damage by incoming hard objects is less likely. When knife damage is a bigger concern than slot blockage, the operator may decide to remove the transverse beam 72 and operate the cutting device 18 without it.

Preferably, however, the transverse beam 72 is configured to stay out of contact with the free ends of the legs 51, 52 of the operating members 53 when the support frame 54 is in the employed position. FIG. 5 shows a configuration of the cutting device 18 in an operative state with the support frame 54 in its employed position and the knives 42 extended into the crop path. The transverse beam 72 is moved away from the openings in the rear wall of the support frame 54 in order to allow the free ends of the legs 51, 52 of the operating member 53 to move backwards when the knife 42 is hit by, e.g., a stone. FIG. 6 shows how this position of the transverse beam 72 allows such movement.

The movement of the transverse beam 72 between its blocking position (FIG. 3) and the non-operative position of FIGS. 5 and 6 can be achieved in numerous ways. For example, the transverse beam 72 may be movable between a blocking and a non-blocking position by an actuator (not shown). Such an actuator may be user-operated, or the actuator may be operated automatically when switching between the blocking position and the non-operative position. The actuator may either pivot or slide the transverse beam 72 out of and into its blocking position. Combinations of pivoting and sliding are also foreseeable.

FIG. 4 shows an example of a knife insert assistant 70 that does not require a separate actuator to be moved between its blocking and its non-blocking positions. In addition to the transverse beam 72, this knife insert assistant 70 comprises two side plates 74, each provided at one end of the transverse beam 72. The side plates 74 are configured for coupling the knife insert assistant 70 to the support frame 54 in a way that allows the transverse beam 72 to automatically move between its blocking position, while moving the support frame 54 towards the knives 42, and its non-operative position, when the knives 42 are extended into the crop path.

To enable this automated transition, each side plate 74 is coupled to the agricultural baler 10 at two points. A first coupling couples the side plate 74 to the moving support frame 54. A second coupling couples the side plate 74 to the chassis of the agricultural baler 10 or to a part of the crop cutting device 18 that does not move relative to the chassis.

The first coupling, i.e. the coupling to the support frame 54 is a pivotal coupling, which in this example is provided by a circular opening 76 in the rear upper corner of the side plate. This circular opening 76 is configured to cooperate with a rod or roller attached to the support frame 54 and allows for pivoting the transverse beam 72 relative to the support frame 54. Alternatively, the side plates 74 may have a rod or roller that cooperates with an opening in the side elements of the support frame 54.

The second coupling, i.e. the coupling to the chassis of the agricultural baler 10 or to a part of the crop cutting device 18, is a sliding coupling. This sliding coupling is formed by a cam track 78 that is provided in each side plate 74 and configured to cooperate with a cam follower that is fixedly attached to the chassis. The cam follower may be a simple rod or a roller.

Together, the cam track 78 and the cam follower control the pivotal movement of the knife insert assistant 70 relative to the support frame 74. For this purpose, the cam track 78 comprises a first track section 78a and a second track section 78b. The first track section 78a is substantially parallel to the direction of movement of the support frame 54, such that pushing or pulling the support frame 54 forward in the direction of the knives 42 will cause the knife insert assistant 70 to move in parallel with the support frame 54 and the transverse beam 72 to remain in its blocking position. The second track section 78b is angled with respect to the first track section 78a and thus also with respect to the direction of movement of the support frame 54. When the cam follower moves from the first track section 78a into the second track section 78b and the support frame 54 continues moving forward, the knife insert assistant 70 starts pivoting and the transverse beam 72 is lowered until the cam follower reaches the end of the cam track 78 or the support frame 54 stops moving. The transverse beam 72 then is in the position shown in FIGS. 5 and 6, in which the legs 51, 52 of the control member 53 can freely slide through the openings in the rear wall of the support frame 54.

When the knives 42 are retracted and the support frame 54 moves rearward, back to its retracted position, the cam follower follows the same cam track 78 in the opposite direction. First the knife insert assistant 70 pivots to move the transverse beam 72 upward into its position directly behind the rear wall of the support frame 54. Then, the transverse beam 72 will move in parallel and together with the support frame 54 until the cam follower reaches the start of the cam track 78 or the support frame 54 is back in its retracted position. There the knife insert assistant 70 will be ready to assist with unblocking blocked slots 41 when the knives 42 are extended into the crop path again.

The invention claimed is:

1. A crop cutting device for an agricultural harvester comprising:
   a crop guiding surface;
   a plurality of substantially parallel knives mounted below the crop guiding surface and aligned with respective slots in the crop guiding surface, the knives being movable between a retracted inoperative position below the crop guiding surface and an extended operative position, wherein at least a portion of a cutting edge of the knives projects above the crop guiding surface;

an actuating mechanism for moving the knives between the retracted inoperative position and the extended operative position, the actuating mechanism comprising:
- (i) a plurality of movable operating members, associated with respective ones of the plurality of knives and movable from a first position in which the knives are in the retracted inoperative position, to a second position in which the knives are in the extended operative position;
- (ii) a support frame configured to hold the operating members in a sliding relation to the support frame; and
- (iii) an actuator coupled to the support frame for moving the support frame between an employed position and a retracted position, the employed position being closer to the knives than the retracted position; and a knife insert assistant that is coupled to the support frame and configured for blocking a sliding movement of the operating members relative to the support frame during a movement of the support frame from the retracted position to the employed position, wherein each operating member has (i) an elongated shape, (ii) a first end coupled to one of the respective knives for bringing the respective knife into the extended operative position, and (iii) a second free end that is opposite the first end, wherein the knife insert assistant comprises a transverse beam that is movable between a blocking position where the traverse beam is positioned to face the second free end for blocking the sliding movement of the operating members relative to the support frame, and a non-blocking position where the traverse beam is separated from the second free ends and does not block the sliding movement of the second free ends relative to the support frame.

2. The crop cutting device of claim 1, wherein the knife insert assistant is configured for allowing the sliding movement of the operating members relative to the support frame when the support frame is in the employed position.

3. The crop cutting device of claim 1, wherein the transverse beam is configured to stay out of contact with the second end of the operating members when the support frame is in the employed position.

4. The crop cutting device of claim 1, wherein the knife insert assistant further comprises two side plates provided at both ends of the transverse beam and connected to the support frame for movement therewith during movement of the support frame between the employed position and the retracted position.

5. The crop cutting device of claim 4, wherein the side plates are pivotally connected to the support frame.

6. The crop cutting device of claim 5, wherein each of the side plates comprises a cam track.

7. The crop cutting device of claim 6, wherein:
the cam track of one of the side plates is a first track section configured to facilitate movement of the transverse beam in substantially a same direction as the support frame, and
the cam track of another one of the side plates is a second track section configured to facilitate rotational movement of the transverse beam relative to the support frame.

8. The crop cutting device of claim 1, wherein the operating members are coupled to the support frame via a spring.

9. An agricultural harvester comprising the crop cutting device of claim 1.

10. The crop cutting device of claim 1, wherein the knife insert assistant is directly and pivotably coupled to the support frame and moves along with the support frame as the support frame moves between the employed position and the retracted position.

* * * * *